United States Patent Office 3,629,173
Patented Dec. 21, 1971

3,629,173
ACCELERATED CURING SYSTEM FOR DEPOLYMERIZED RUBBER
Albert R. Miller, Somerdale, N.J., Douglass E. Brooks, Ambler, Pa., assignors to E. F. Houghton & Co., Philadelphia, Pa.
Filed Mar. 5, 1969, Ser. No. 804,492
Int. Cl. C08d 9/14; C08f 21/04; C08h 9/00
U.S. Cl. 260—23.7                 8 Claims

ABSTRACT OF THE DISCLOSURE

The curing of depolymerized polyisoprene rubber can be accelerated by the addition of a saturated $C_4$–$C_{12}$ monobasic aliphatic acid, or the amine or ammonium salts of such acids, to the p-quinonedioxime-lead dioxide curing system for depolymerized rubber.

BACKGROUND OF THE INVENTION

Figure 1:
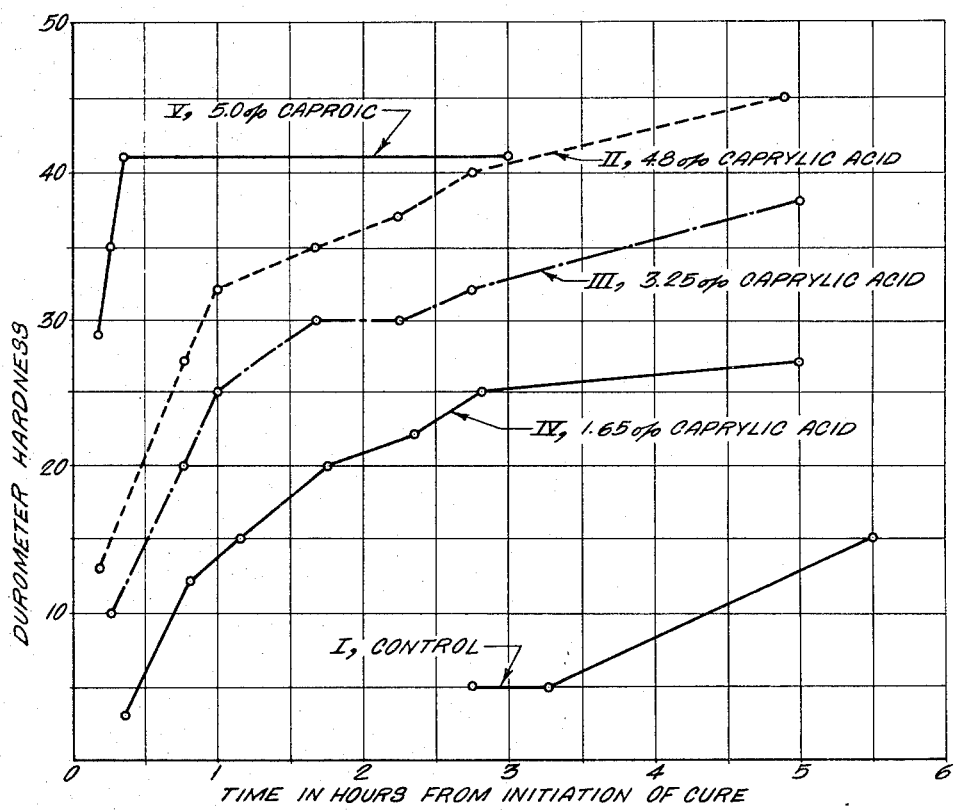

Liquid depolymerized polyisoprene rubber has many useful applications as a sealant. For example, uncured liquid depolymerized rubber may be poured into voids to be sealed and then cured in situ to form a rubber seal without the application of heat or the addition of sulphur. Uncured liquid depolymerized rubber may also be poured into molds to form precision seals, such as gaskets, the rubber being cured in situ in the mold.

U.S. Pat. No. 3,160,595 describes a process for curing depolymerized polyisoprene rubber at room temperature by means of p-quinonedioxime and lead dioxide. The cured rubber has a characteristic tack on those surfaces of the rubber exposed to air. This tacky surface is undesirable for many applications and, according to the patent, can be eliminated only by a time consuming process involving the addition to the rubber composition of a synthetic resin, such as polyethylene.

In the manufacture of cast articles, such as gaskets, from depolymerized rubber, the economics of the process require a relatively rapid rate of initial cure so that the cast articles can be stripped from the molds in a relatively short period of time after being cast, the remainder of the cure taking place after removal of the formed article from the mold. In this way the number of molds required for a given rate of production can be held to a minimum.

By reason of the relatively slow curing rate of depolymerized rubber using the p-quinonedioxime-lead dioxide system, it has limited utility in the production of cast object of depolymerized rubber. Although, triethanolamine accelerates the rate of cure to some degree, the cured rubber retains its tacky surface.

It is an object of this invention to provide an improved curing system for depolymerized polyisoprene rubber.

Another object of this invention is the provision of a cured depolymerized polyisoprene rubber having improved physical properties.

These and other objects of this invention will become further apparent from the following discussion and by reference to the attached drawings.

The depolymerized polyisoprene rubber used in carrying out the present invention is a standard article of commerce. It may be prepared by masticating solid polyisoprene rubber in convention milling equipment until the solid is soft and dough-like. Heat accelerates the depolymerization and solid polyisoprene rubber when milled at 500° F. will turn to a free flowing liquid having the consistency of honey at the end of six hours. Liquid depolymerized rubber can also be prepared by heating crepe rubber in its own weight of nitrobenzene at 180° C. under reflux for 20 minutes, followed by heating the charge at 120° C. for 3 hours. The liquid rubber is recovered by removal of nitrobenzene by steam distillation at 120° C. In another process, natural or synthetic polyisoprene is degraded by treatment in a solvent with an aromatic sulfohydrazide in the presence of oxygen. Raw rubber can also be depolymerized by treatment with a peroxy compound in the pressure of an organic compound containing a thiocarboxyl or thiol group (see Encyclopedia of Chemical Technology, 2nd Ed., Interscience Publishers (1968), Vol. 17, page 655).

The term "depolymerized polyisoprene rubber" as used in this specification and claims, may be prepared by any of the above described processes, and is intended to means either natural or synthetic depolymerized rubber which without volatiles has a viscosity of not more than about 1,500,000 cps. at 68° F. as measured by a standard Brookfield viscometer. For a free flowing liquid which may be readily poured the viscosity of the depolymerized rubber should be in the neighborhood of 225,000 cps. at 68° F. and, of course, lower viscosities may be employed in accordance with the present invention. If desired convention diluents or non-volatile liquid extenders extenders may be added to the depolymerized polyisoprene rubber provided the viscosity of the mixture is at or below the above-stated maximum.

It was discovered that certain fatty acids, as well as ammonium and certain amine salts of these acids, more fully, described hereinafter, are highly effective curing accelerators in the room temperature curing of depolymerized polyisoprene rubber using the p-quinonedioxime-lead dioxide curing system. These fatty acids, and their amine greatly increase the initial rate of cure. In addition, the tackiness of the cured rubber is greatly reduced.

By reason of the greatly increased rate of initial cure obtained by the use of these compounds, the manufacture of molded products, such as sealing rings, from depolymerized polyisoprene rubber has been made considerably more economical. For example, the products can be stripped from molds in a matter of minutes as compared to hours after pouring, thereby greatly increasing production for a given number of molds. Advantageously, by use of the new accelerators, depolymerized polyisoprene rubber is particularly useful as a rapid setting potting compound. In addition, the rubber cured with these accelerators has substantially decreased tackiness as compared to depolymerized polyisoprene rubber which has been cured according to the prior methods.

The fatty or monobasic saturated aliphatic acid accelerators of this invention contain from 4 to 12 carbon atoms. Included in this group of acids are butyric, valeric, caproic, enanthylic, caprylic, pelargonic, capric, undecylic and lauric acids. The amine salts of these acids, such as the diethanolamine, triethanolamine, isopropylamine and cyclohexylamine salts of these acids also accelerate the rate of cure of depolymerized polyisoprene rubber by p-quinonedioxime and lead dioxide. These accelerators have a melting point below about 120° F., and are soluble in the depolymerized polyisoprene rubber at room temperature.

A preferred accelerator is caprylic acid, for even at concentrations as low as about 1 percent, by weight of the total rubber composition, the acid greatly increases the initial rate of curing. This increase in curing rate is evidenced by high initial Durometer Hardness and rapid decrease in tackiness, as can be seen by reference to the attached drawings, discussed in detail hereinafter.

According to this invention, the accelerator ordinarily will be combined with the depolymerized isoprene rubber, following which are added the p-quinonedioxime and lead dioxide curing agents to effect the room temperature cure. Alternatively, a stable composition which can be stored for extended periods of time may be obtained by uniformly blending all of the constituents except the lead dioxide, which may be added at the time of use. As noted above, significant acceleration of the cure can be obtained with as little as 1 percent, by weight of accelerator, based on the total weight of the rubber composition including additives and curing agents. For most purposes, from about 1 to about 10 percent accelerator will produce satisfactory results in terms of accelerated cure and reduced tack.

toegther and applied as a smooth layer to a flat metal surface and permitted to cure at room temperature.

The term "cure" as used in this specification is to be given the usual meaning accorded it in the rubber art. This is a relative, rather than an absolute term, the degree of cure with relation to time depending upon the particular rubber composition.

TABLE

| Formula | I | II | III | IV | V | VI | VII | VIII | IX | X | XI |
|---|---|---|---|---|---|---|---|---|---|---|---|
| Mat.: | | | | | | | | | | | |
| Depolymerized rubber | 37.7 | 37.10 | 36.41 | 35.85 | 36.05 | 36.05 | 36.05 | 36.05 | 35.41 | 35.59 | 35.00 |
| d-Limonene | 7.0 | 6.82 | 6.80 | 6.69 | 7.23 | 7.23 | 7.23 | 7.23 | 6.48 | 6.60 | 6.52 |
| p-Quinonedioxime | 1.7 | 1.73 | 1.72 | 1.69 | 1.87 | 1.87 | 1.87 | 1.87 | 1.67 | 1.67 | 1.65 |
| McNamee clay | 37.7 | 37.10 | 36.41 | 35.85 | 36.05 | 36.05 | 36.05 | 36.05 | 35.41 | 35.58 | 35.00 |
| Triethanolamine | | | | | | | | | *4.15 | *.80 | *5.48 |
| Caprylic acid | | 1.65 | 3.26 | 4.80 | | | | | *1.98 | *4.76 | *1.55 |
| Caproic acid | | | | | 5.0 | | | | | | |
| Capric acid | | | | | | 5.0 | | | | | |
| Lauric acid | | | | | | | 5.0 | | | | |
| Pelargonic acid | | | | | | | | 5.0 | | | |
| Lead dioxide | 10.6 | 10.40 | 10.27 | 10.08 | 9.20 | 9.20 | 9.20 | 9.20 | 9.93 | 10.00 | 9.87 |
| Dibutylphthalate | 5.3 | 5.20 | 5.13 | 5.04 | 4.60 | 4.60 | 4.60 | 4.60 | 4.97 | 5.00 | 4.93 |
| Total | 100.00 | 100.00 | 100.00 | 100.00 | 100.00 | 100.00 | 100.00 | 100.00 | 100.00 | 100.00 | 100.00 |

*Combined as a salt.

Preferably, the amount of accelerator used is in the range between about 2 and about 6 percent.

The proportions of curing agents may be varied over a relatively wide range but generally from about 3 parts to about 5 parts by weight of p-quinonedioxime and from about 7.5 parts to about 25 parts by weight of lead dioxide for each 100 parts by weight of depolymerized rubber will effect a complete cure. The use of an excess of curing reagents over these amounts produces a somewhat more rapid cure, whereas the use of lesser amounts causes a decrease in curing rates. These effects can be offset by proper selection of amount of accelerator.

As in conventional practice fillers are employed in compounding the depolymerized polyisoprene rubber of the present invention and varying proportions may be employed. Bulk fillers include silica, clays and calcium carbonate. The weight of filler employed may exceed that of the depolymerized polyisoprene rubber. Zinc oxide and zinc sulfide are helpful where light color is desired. For troweling compounds useful in sealing cracks the usual thixotropic fillers such as Cab-O-Sil, Bentonite or Santocel are employed. Other fillers of the so called specialty types such as carbon black, acetylene black, finely divided aluminum and glass fibers may be employed to build up the desired physical characteristics into the cured product. It will be understood, however, that fillers are not necessary and the depolymerized polyisoprene rubber may be cured with the p-quinonedioxime-lead dioxide system without the addition of fillers.

In addition, sulfur can be added to increase the hardness of the cured rubber. The quantity of sulfur used for this purpose ordinarily will be in the range of from about 5 to about 30 percent, by weight, based on the total weight of the rubber composition.

The following examples set forth in Table I below further illustrate the substantial improvement which can be obtained according to the present invention. In each of the examples the percentages are by weight. The compositions initially comprised two parts, A and B, each of which was separately mixed in conventional equipment to provide a uniform homogeneous mixture of ingredients. The McNamee clay and p-quinonedioxime were added to the depolymerized isoprene rubber and were mixed to a smooth dispersion free of agglomerates. Thereafter, the liquid constituents, d-Limonene and accelerator, were added and mixed with the batch. Frictional heat is generated because of mixing which lowers the viscosity of Part A and, if desired, heat can be applied to warm the batch and lower its viscosity for ease of mixing. Part A is stable and may be stored for extended periods of time.

As to Part B, the lead dioxide was wetted with the dibutyl phthalate and mixed in a paint mill to obtain a paste.

Parts A and B were subsequently combined and blended

Figure 2:
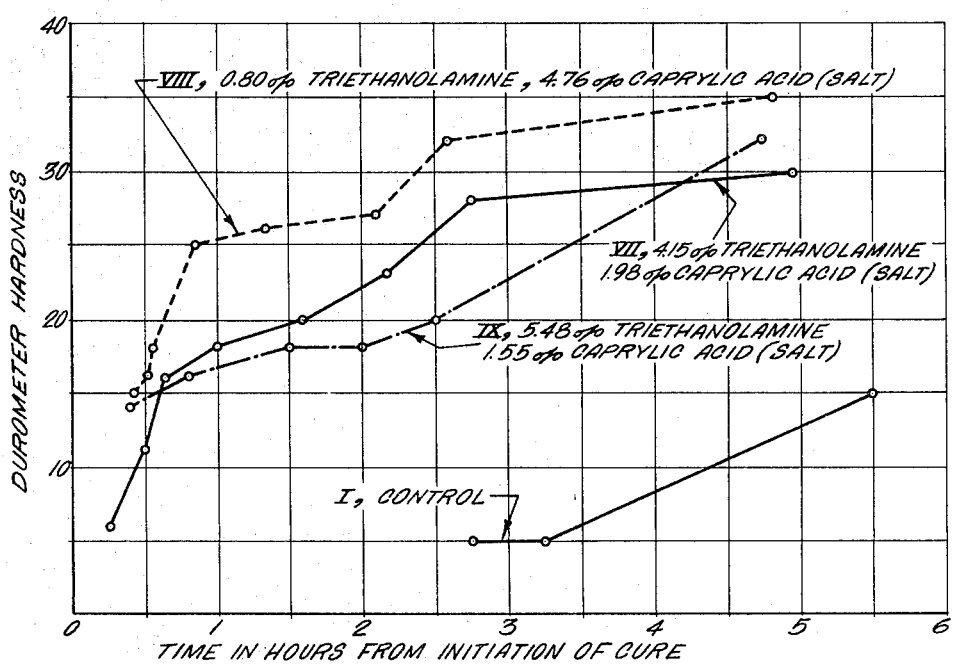
Figure 3:
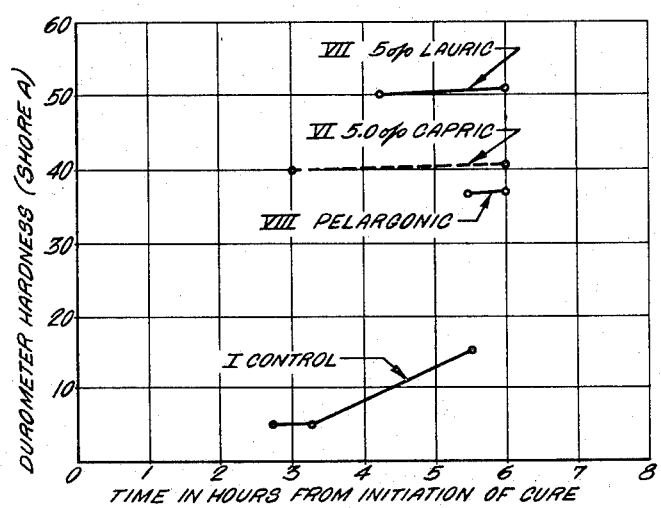

In FIGS. 1, 2 and 3 Durometer Hardness, Shore A, is plotted against time for compositions of Table I. Measurement of elapsed time commenced with addition of Part B to Part A. Each dot within a circle represents the hardness determined at the stated time.

As can be seen by reference to FIG. 1, cure of the control (no accelerator) as evidenced by an increase in hardness did not occur until three and a quarter hours had elapsed, and then the rate of cure was relatively slow. On the other hand, when an accelerator, either caprylic or caproic acid, was added in accordance with this invention, a substantial increase in hardness took place in the first hour, showing a high initial rate of cure. FIG. 1 also shows that rate of cure increases with increasing amounts of accelerator.

Similar results are shown by the data which has been plotted in FIG. 2. In this figure, however, the accelerator is the triethanolamine salt of caprylic acid (Example IX), or a mixture of this salt and either caprylic acid (Example X) or triethanolamine (Example XI).

In FIG. 3, the accelerating affect on room temperature cure of certain other fatty acids is shown. It can be seen that the rate of cure, as indicated by an increase in hardness, is several fold that of the control (Example I).

Another measure of degree of cure from which rate of cure can be determined is degree of tackiness as determined by the Rolling Ball Test developed by Douglas Aircraft Corp. (see the article by Chang, F. S. C., Adhesives Age 1, 32 (1958)). In this test a steel ball is caused to roll across a film of the material tested at given time intervals after initiation of cure and the distance the ball travels is measured in inches. The greater the distance of travel, the higher the degree of cure at the time of testing.

The apparatus used in this test comprises a section of angle iron, approximately eight inches in length held toward one end by an ordinary laboratory clamp and stand. One end of the angle iron is in contact with the specimen being tested while the other is elevated to a selected angle. A steel ball, one half inch in diameter and weighing eight grams, is then placed at the upper end of the angle iron and allowed to freely roll down onto the test specimen. As stated above, the distance the ball traverses over the specimen is a measurement of the degree of tack.

Figure 4:
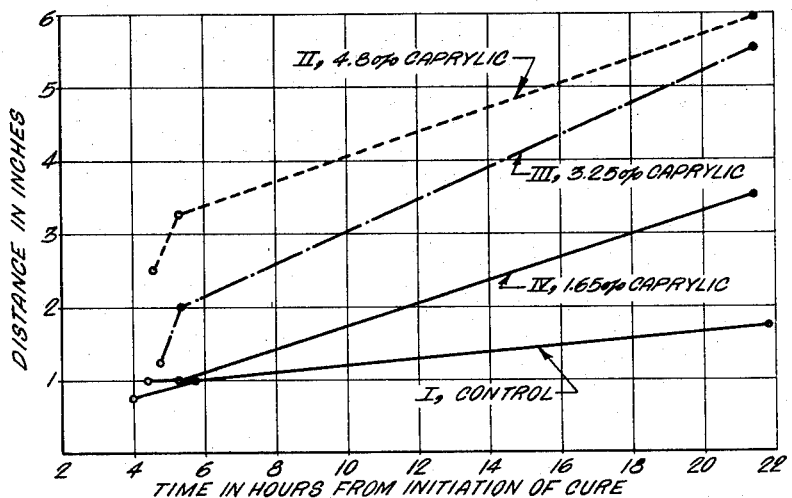
Figure 5:
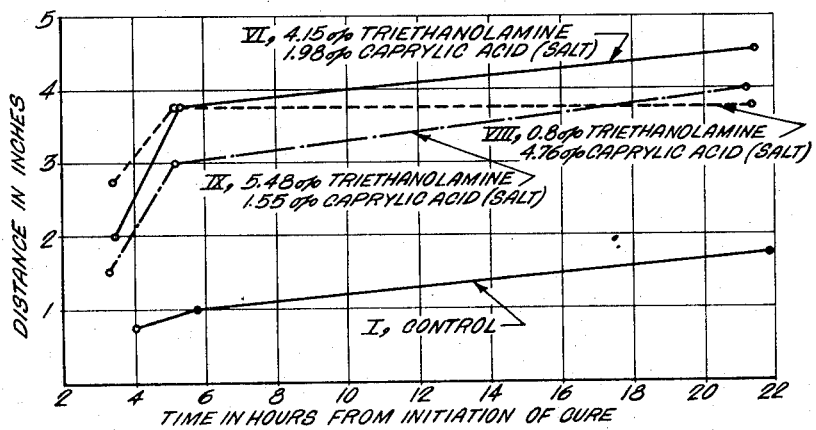

The data plotted in FIGS. 4 and 5 where obtained using the above-described apparatus, the angle the angle iron made with the horizontal being 6 degrees. In the figures, the encircled dots are the actual distance the ball traveled at the stated times. As can be seen, those compositions containing accelerators in accordance with this invention evidence greatly reduced tackiness at any given time during cure as compared to the control which did not contain an accelerator. These figures also show that curing rate, as shown by reduced tackiness, increases as the quantity of accelerator is increased.

While the presently preferred embodiments of the invention have been described, it should be understood that it may otherwise be embodied within the scope of the appended claims.

Having thus described our invention, we claim:

1. In the process for room temperature curing of depolymerized polyisoprene rubber having a viscosity no greater than about 1,500,000 cps. at 68° F. as measured on a standard Brookfield viscosimeter employing p-quinonedioxime and lead dioxide as curing agent, the improvement which comprises adding to the depolymerized polyisoprene rubber from about 1 to about 10 percent, by weight, based on the weight of the rubber composition, of an accelerator selected from the group consisting of saturated aliphatic monobasic acids containing from 4 to 12 carbon atoms, and the amine salts of said acids.

2. The process of claim 1 wherein from about 2 to about 6 percent of said accelerator is added to said rubber.

3. The process according to claim 1 wherein said accelerator is caprylic acid.

4. The process according to claim 1 wherein said accelerator is the triethanolamine salt of caprylic acid.

5. A product of the process of claim 1.

6. A composition according to claim 1 wherein said rubber contains from about 2 to about 6 percent by weight of said accelerator.

7. A composition according to claim 1 wherein said accelerator is caprylic acid.

8. A composition according to laim 1 wherein said accelerator is the triethanolamine salt of caprylic acid.

References Cited

UNITED STATES PATENTS 3,160,595   12/1964   Handman et al. _____ 260—2.3

OTHER REFERENCES

Synthetic Rubber, by Whitby (1954); Wiley & Sons; pp. 867–868, "Vulcanization Without Sulfur."

Vulcanization and Vulcanizing Agents, by W. Hoffmann; Palmerton Publishing Co., Inc.; pp. 355, "Activators and Retarders."

JOSEPH L. SCHOFER, Primary Examiner

W. F. HAMROCK, Assistant Examiner

U.S. Cl. X.R.

260—2.3, 94.7, 96, 731

UNITED STATES PATENT OFFICE
CERTIFICATE OF CORRECTION

Patent No. 3,629,173     Dated Dec. 21, 1971

Inventor(s) Albert R. Miller and Douglass E. Brooks

It is certified that error appears in the above-identified patent and that said Letters Patent are hereby corrected as shown below:

Col. 2, l. 6, "pressure" should read -- presence --;

Col. 2, l. 13, "means" should read -- mean --;

Col. 2, l. 20, "convention" should read -- conventional --;

Col. 2, l. 21, "extenders" is repeated twice;

Col. 5, l. 11, "viscosimeter" should read -- viscosmeter --.

Col. 6, l. 5, "laim" should read -- claim --.

Signed and sealed this 25th day of July 1972.

(SEAL)
Attest:

EDWARD M. FLETCHER, JR.         ROBERT GOTTSCHALK
Attesting Officer                Commissioner of Patents